United States Patent [19]

Stöckel et al.

[11] 4,160,855
[45] Jul. 10, 1979

[54] ELECTRICAL CONTACT ELEMENT AND METHOD OF PRODUCING THE SAME

[75] Inventors: Dieter Stöckel, Birkenfeld; Hans-Jürgen Oberg, Kelterndietlingen, both of Fed. Rep. of Germany

[73] Assignee: G. Rau, Pforzheim, Fed. Rep. of Germany

[21] Appl. No.: 826,194

[22] Filed: Aug. 19, 1977

[30] Foreign Application Priority Data

Sep. 21, 1976 [DE] Fed. Rep. of Germany ....... 2642323

[51] Int. Cl.² .............................................. B23K 21/02
[52] U.S. Cl. .................................... 428/621; 428/652; 428/673; 428/929
[58] Field of Search ............... 428/621, 650, 652, 653, 428/673, 926, 929, 940; 228/110, 111; 29/630 C

[56] References Cited

U.S. PATENT DOCUMENTS

| | | | |
|---|---|---|---|
| 2,946,119 | 7/1960 | Jones et al. | 228/110 |
| 3,330,026 | 7/1967 | Best et al. | 228/111 |
| 3,461,542 | 8/1969 | Schoenthaler | 228/110 |
| 3,531,852 | 10/1970 | Slemmons | 228/110 |
| 3,574,570 | 4/1971 | Gwyn, Jr. | 428/929 |
| 3,666,428 | 5/1972 | Haarbye | 428/929 |
| 3,674,446 | 7/1972 | Haarbye et al. | 428/673 |
| 3,775,067 | 11/1973 | Backstrom | 428/673 |
| 3,926,357 | 12/1975 | Matrisian | 228/110 |
| 3,941,299 | 3/1976 | Godfrey | 228/219 |
| 4,019,876 | 4/1977 | Stöckel et al. | 428/621 |

FOREIGN PATENT DOCUMENTS 458560 4/1967 Switzerland.

Primary Examiner—L. Dewayne Rutledge
Assistant Examiner—Michael L. Lewis
Attorney, Agent, or Firm—Wenderoth, Lind & Ponack

[57] ABSTRACT

The contact element is produced by ultrasonic welding one or more contact pieces onto a carrier, an intermediate layer in the form of a metal powder, for example aluminium, being interposed between the contact piece and the carrier prior to such welding in order to assist in the welding of contact pieces made of material which would otherwise be difficult to weld.

3 Claims, 1 Drawing Figure

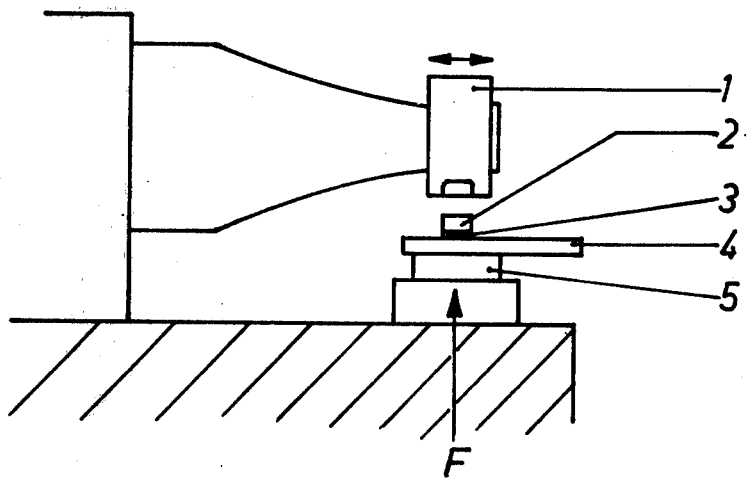

ELECTRICAL CONTACT ELEMENT AND METHOD OF PRODUCING THE SAME

BACKGROUND OF THE INVENTION

The present invention relates to an electrical contact element of the type in which at least one contact piece is joined to a carrier by ultrasonic welding. A method for producing such contact elements is also described.

The invention disclosed herein is related to that disclosed in the specification of U.S. Pat. No. 4,019,876 which is incorporated herein by reference. U.S. Pat. No. 4,019,876 discloses a contact element in which an intermediate layer of a readily cold-weldable metal material is arranged between the contact piece and the carrier. Further tests have shown that in some instances particular advantages can be achieved if the intermediate layer consists of a metallic powder or of a mixture of metallic powders shaped by ultrasonic welding. The thickness of the powder layer, prior to welding, may advantageously lie below 100 $\mu$m and usually below 10 $\mu$m. A surprisingly firm connection between the contact piece and the carrier is achieved during the ultrasonic operation.

BRIEF DESCRIPTION OF THE DRAWING

The accompanying drawing is a diagrammatical side elevation of an ultrasonic welding machine suitable for manufacturing the electrical contact elements of the present invention.

DETAILED DESCRIPTION OF THE INVENTION

The machine comprises an ultrasonic vibrator 1 whose main direction of vibration is indicated by the arrow F. Small contact pieces in the form of plates 2 were joined one at a time to a brass carrier strip 4, an intermediate layer 3 of aluminum powder being interposed between the plates and the carrier. The necessary welding pressure was applied by way of an anvil part 5. The individual contact plates 2 were fed from a supply container by way of a suitable feed chute (not shown) onto the surface of the heaped powder layer 3. The directions of movement of the carrier 4 are indicated by a double-headed arrow.

In an advantageous procedure for forming the invention, the layer of metallic powder is heaped or scattered on the carrier or is applied thereto in the form of an emulsion, for example as a paint incorporating a binding agent (e.g. Al-bronze) that is to some extent volatile, and the contact piece is joined to the carrier by the intermediate layer of powder and by ultrasonic welding during which pressure is applied. In some case, it may suffice if, instead of the powder being in a homogenous layer, it is applied in such manner that a discontinuous layer is formed.

In many applications, the contact elements produced in accordance with the invention exhibit advantageous properties, and they are inexpensive to manufacture as mass-produced articles and enable contact materials that resist fusion to be used. Since the parts to be connected are not heated up to any considerable extent during ultrasonic welding, the mechanical properties of the carrier and of the contact piece are retained.

EXAMPLE

A small contact piece in the form of a plate made of AgCdO in which non-metallic components of cadmium oxide were contained in a silver matrix material, had a diameter of 4.5 mm and a thickness of 1.5 mm. After an intermediate layer of pure aluminium powder having a particle size of less than 10 $\mu$m had been interposed, this contact piece was joined by ultrasonic welding to a carrier in the form of a brass strip having a width of 8 mm and a thickness of 0.7 mm.

The output of the ultrasonic oscillator was 1200 W and its frequency 20 kHz. During the welding operation a compressive force of approximately 736 N was applied. The welding time was approximately 0.5 sec. During welding, the excess quantity of powder was pressed out sideways at the edge of the contact piece.

We claim:

1. In an electrical element of the type including at least one contact piece joined to a carrier by means of ultrasonic welding, and an intermediate layer of readily cold-weldable metallic material which is inserted between each contact piece and the carrier prior to ultrasonic welding, the improvement wherein said intermediate layer consists of a metal powder shaped by the ultrasonic welding operation into said intermediate layer simultaneously with the joining of said carrier and each contact piece by the ultrasonic welding operation, and wherein the thickness of the metal powder prior to the ultrasonic welding operation is less than 100 $\mu$m.

2. The improvement claimed in claim 1, wherein at least the major portion of said metal powder consists of aluminum powder.

3. The improvement claimed in claim 1, wherein said metal powder is embedded in a binding agent.

* * * * *